W. R. KINNEAR.
METAL SASH CONSTRUCTION.
APPLICATION FILED NOV. 17, 1909.
971,011.
Patented Sept. 20, 1910.
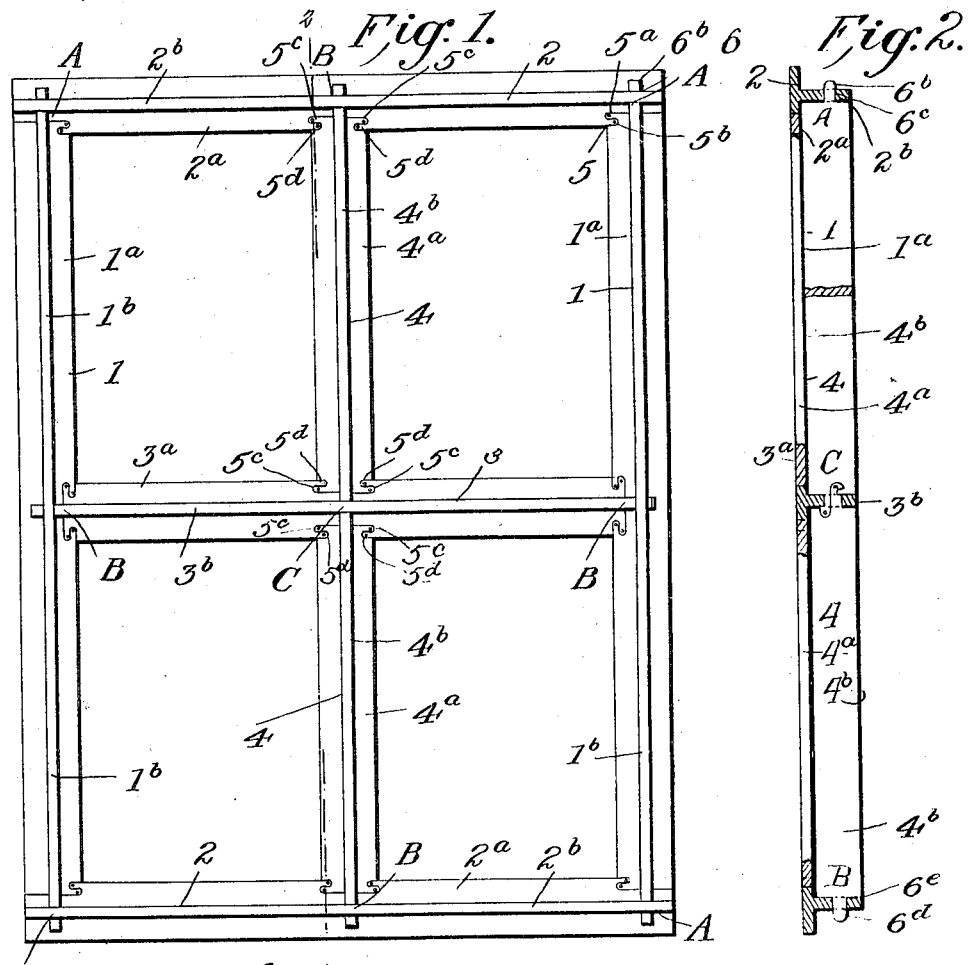
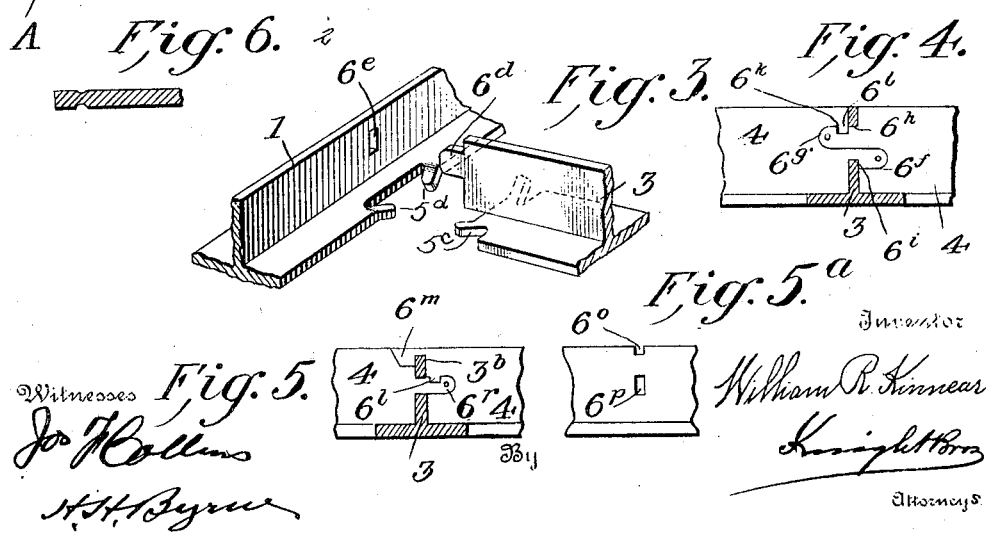
Witnesses
Jo. H. Collins
H. H. Byrne
Inventor
William R. Kinnear
Knight Bros
Attorneys

UNITED STATES PATENT OFFICE.

WILLIAM R. KINNEAR, OF NEW CASTLE, PENNSYLVANIA.

METAL SASH CONSTRUCTION.

971,011.          Specification of Letters Patent.     Patented Sept. 20, 1910.

Application filed November 17, 1909. Serial No. 528,501.

*To all whom it may concern:*

Be it known that I, WILLIAM R. KINNEAR, a citizen of the United States, residing at New Castle, in the county of Lawrence and State of Pennsylvania, have invented certain new and useful Improvements in Metal Sash Construction, of which the following is a specification.

This invention relates to a metallic structure in the nature of a sash or frame to be used in building construction and it has for its object to provide a structure of this kind in which the several members will be interlocked together in a manner not only to prevent separation but to develop rigidity against strains, which seek to move the members angularly, longitudinally, transversely or torsionally, and to secure these results in a relatively light, cheap and easily assembled structure.

In carrying out the invention, each joint is produced by a plurality of interlocks so disposed that one assists the other in accomplishing the ends desired, by being offset therefrom in two directions; the fullest development of the idea involving at each interlock, resistance to relative movement of the parts tensionally, by abutment and transversely.

For purposes of illustration, several embodiments of the invention, suitable for the different joints that naturally occur in a frame or sash made up of a plurality of intersecting members, are shown in the accompanying drawings in which, Figure 1 is a front view of a complete structure; Fig. 2 is a section on the line 2—2, Fig. 1; Fig. 3 is a perspective view of the separated parts of a joint between the end of a member and an intermediate portion of another member; Fig. 4 is a sectional view on an enlarged scale showing the joint at the middle of Fig. 2 formed between two abutting ends and the intermediate portion of a continuous intersecting member; Fig. 5 is a view illustrating a modified construction of joint used in a position such as illustrated at the middle of Fig. 2 and in Fig. 4; Fig. 5ª is a detail view of the continuous member forming part of the joint shown in Fig. 5; and Fig. 6 is a sectional detail view of a protruding dowel or tongue expanded (as by center-punching) for the purpose of preventing withdrawal after assembly.

In a structure of the kind to which the invention is particularly adapted and which is made up of outer members such as a pair of vertical stiles 1 and top and bottom rails 2, together with a plurality of intermediate members 3, 4 intersecting one another and abutting at their ends against the outer members, the three classes of joints are naturally required for assembling the members of the structure; to wit, corner joints, such as represented at A, employed for connecting together the outer members; end joints B, employed for connecting the end of an intermediate member with an intermediate portion of another member; and abutting joints such as shown at C, where two short intermediate members are brought into abutment against opposite sides of and are interlocked with an intermediate member.

The structure herein illustrated embodies but four light spaces, produced by but two intersecting lines of intermediate members, but this illustration is selected merely because it affords opportunity for illustrating the application of the invention to each of the several kinds of joint involved in a structure of this kind, and it is to be understood that as many intermediate members may be employed as is required to provide the necessary number of light openings, these intermediate members being arranged in intersecting lines or otherwise, as may be desired.

The frame or sash is made up of metal bars of angular construction, the intermediate members at least, and preferably the outer members as well, being of T-section, so as to provide flanges in the plane of the frame, and webs extending perpendicularly thereto for the purpose of embodying in each joint, a plurality of interlocks offset from one another in a direction perpendicular to the plane of the structure, for reasons already suggested and hereinafter set forth more at length.

Each corner joint A comprises an interlock 5 in the plane of the flanges 1ª and 2ª of the members 1 and 2; said interlock being provided by a lateral notch or recess in one of the flanges (1ª), leaving a laterally presented tongue $5^a$ in said flange, and a longitudinal recess in the other flange ($2^a$), leaving a longitudinally presented tongue $5^b$, so that said members may be assembled by a lateral movement of the member 1 relatively to the member 2; said joint A further comprising an interlock 6 between the webs $1^b$ and $2^b$ of the members 1 and 2, perpendicularly offset from the plane of the interlock 5, and produced by the tongue $6^b$ on one of the webs ($1^b$), preferably of rectangular section extending through and closely fitting the perforation $6^c$ in the web ($2^b$) of the other member. Disengagement of the tongues $5^a$, $5^b$ can take place only in a direction which would move the dowel $6^b$ laterally and is therefore resisted by the resistance to shearing strain of the dowel $6^b$. Relative displacement between the flanges $1^a$ and $2^a$ transversely to their plane is also prevented by the shearing resistance of the dowel $6^b$, while withdrawal of the dowel $6^b$ is resisted by the interlock between the tongues $5^a$ and $5^b$. In order to assemble the joint A, the tongues $5^a$ and $5^b$ are displaced or struck up relatively to each other in a manner similar to that illustrated in Fig. 3, so that the parts may be assembled by passing the dowel $6^b$ into the perforations $6^c$. After the dowel $6^b$ is firmly seated, the tongues $5^a$ and $5^b$ are pressed or hammered until they are again brought into the same plane, when the joint A will be firmly interlocked. To cause the parts to fit very tightly and to prevent withdrawal of the dowel $6^b$ under a torsional strain of the member 2 relatively to the member 1, the dowel $6^b$ as well as the tongues $5^a$, $5^b$ are laterally enlarged or swelled, as for instance by sinking a punch in their faces, the dowel $6^b$ thus being in effect riveted in the opening $6^c$.

The joint B is substantially identical with the joint A in that a dowel $6^d$ on the web $4^b$ enters an opening $6^e$ in the web $2^b$, while the flanges $4^a$ and $2^a$ are interlocked by means of oppositely extending lateral tongues $5^c$ on the end of the member 4, entering the undercut recess behind the longitudinal tongues $5^d$ formed at the intermediate point in the flange $2^a$ of the member 2. The joint B is assembled in a manner substantially identical with the joint A as illustrated in Fig. 3; both pairs of tongues $5^c$ and $5^d$ being deflected from the plane of the members, which carry them until the dowel $6^d$ is firmly seated in the opening $6^e$, after which the tongues are pressed or hammered back into the same plane to bring the parts firmly into interlock; the dowel being then expanded to rivet it in the opening and develop the tensional interlock and the tongues being likewise expanded, if desired, to bring the parts into firmer abutment.

The joint C involves a further development of both the joints A and B in that it comprises interlocking tongues $5^c$, $5^d$ in the base flanges $3^a$, $4^a$ and the interlock between the webs $3^b$, $4^b$, but the webs $4^b$, which abut on opposite sides of the web $3^b$, are firmly interlocked tensionally not only with the web $3^b$ through which they extend, but with each other, the opening $6^h$ in the web $3^b$ being of a size that fits the dowels closely on their lateral faces but permits them to overlap vertically after the manner of a spliced joint; the shoulders of the webs $4^b$ above and below said dowels being in firm abutment against the web $3^b$, and the interlock of the dowels being provided by shoulders such as $6^i$ engaging the wall of the opening beneath the dowel $6^f$ and the shoulder $6^k$ on the dowel $6^g$, which engages the shoulder $6^l$ of the web $4^b$ above said dowel $6^g$, which shoulder in turn rests against the web $3^b$. In assembling this joint, the pair of tongues $5^c$ on the member 4, which carries the under shouldered dowel $6^f$, as well as the tongues $5^d$ on the flange $3^a$ engaged thereby, need not be deflected for the reason that there is room in the opening $6^h$ to admit the dowel $6^f$ with the flanges $4^a$ in a plane above the flanges $3^a$, until the web $4^b$ carrying the dowel $6^f$, abuts against the web $3^b$, whereupon the particular member 4 referred to, is pressed down to interlock the shoulder $6^i$ with the web $3^b$ and to interlock the tongues $5^c$ with the tongues $5^d$; but the tongues $5^c$ carried by the other member 4, which carries the upper dowel $6^g$, as well as the coöperating tongues $5^d$ must be deflected from the plane of the flanges, which carry them and the dowel $6^g$ must be deflected laterally out of the plane of the web $4^b$, which carries it, the coöperating lug or shoulder $6^l$ on the web $4^b$ being likewise deflected laterally so that after the dowel $6^f$ is in place, the dowel $6^g$ may be inserted until the shoulders of its web are in firm abutment with the web $3^b$, after which the end of the dowel $6^g$ and the lug $6^l$ are pressed or hammered back into the same plane to bring them into firm interlock, at which time said dowel $6^g$ will not only tie the abutting members 4 together and indirectly interlock with the part $3^b$ but said dowel $6^f$ as well as the tongues on the member which carries it will be held into firm interlock with the coöperating parts. While riveting or enlargement of the ends of the dowel $6^f$ and $6^g$ is rendered unnecessary by the presence of the shoulders on said dowels, said ends are preferably enlarged or otherwise expanded, as also are the interengaging tongues $5^c$ and $5^d$, adjacent thereto in order to bring the parts into binding relation and prevent any lost motion between them.

The form of abutting interlock shown in

Figs. 5 and 5ᵃ differs from that illustrated in Fig. 4 in that the undercut or shouldered dowel 6ᵐ, which engages directly with the web 3ᵇ, is at the upper edge of the web 4ᵇ instead of at a lower part thereof and engages in a separate notch 6ᵒ instead of entering the same opening 6ᵖ with the other dowel; and said other dowel 6ʳ has its recess upwardly presented being interlocked with the shoulder 6ⁱ on the opposed web 4ᵇ instead of being presented downwardly as in Fig. 4.

From the foregoing description, it will be seen that in each of the three embodiments of joint, there are at least two interlocks, each of which has a direct effect upon the other, in that it prevents relative movement between the parts of the other interlock in any direction in which they could move out of engagement with each other. It will be further seen that said interlocks, by reason of being offset from each other both in the direction parallel to the plane of the flanges and in a direction perpendicular thereto, coöperate or combine to render the joint rigid angularly and torsionally.

It will further be seen that the joints such as shown at B involve the further advantage of imparting further stiffness both angularly and torsionally by duplicating the interlock between the flanges on opposite sides of the plane of the web interlock.

It will further be seen that a joint such as shown at C combines all of the advantages of the joints A and B and in addition thereto ties the two members 4 together and so interlocks them with the transverse member 3 that either member 4 will greatly assist the member 3 in resisting strains imposed by the other member 4.

I claim:—

1. In a metal frame structure, members constructed with flanges and webs rigidly jointed together with their flanges abutting in the plane of the flanges and provided with interlocking parts also lying in said plane and with their webs in abutment and provided with interlocking parts lying in the planes of said webs.

2. In a metal frame structure, members constructed with flanges and webs rigidly jointed together, said members having their webs in abutment and having integral parts interlocking at a point above the plane of the flanges and having their flanges abutting in the plane of the flanges and provided, on opposite sides of the plane of the web-interlock, with parts interlocking in the said plane of the flanges.

3. In a metal frame structure comprising members constructed with flanges and with webs; a joint between two such members comprising an interlock formed between their flanges and a dowel connection formed between their webs.

4. In a metal frame structure, a continuing web-and-flange member having an undercut seat in its flange and a perforation in its web, and an abutting web-and-flange member having an undercut head on its flange fitting the said seat of the continuing member, and a dowel on its web entering the perforation in the web of said continuing member.

5. In a metal frame structure, a web-and-flange member having a longitudinal recess at an intermediate point in its flange and an opening in its web adjacent thereto and a web-and-flange member having its flange abutting that of the first named member in the plane of the flanges and provided with a laterally presented tongue at the end of its flange entering the recess in the flange of the member first named, also having its web in abutment with the web of the member first named and having a dowel in the plane of its web, entering the opening in the web of the member first named.

6. In a metal frame structure a web-and-flange member having a longitudinal recess at an intermediate point in its flange and an opening in its web adjacent thereto and a web-and-flange member having a laterally presented tongue at the end of its flange entering the recess in the flange of the member first named, also having its web in abutment with the web of the member first named and having a dowel on its web entering the opening in the web of the member first named; said dowel being enlarged beyond said opening to produce a tensional interlock between the webs of the members.

7. In a metal frame structure a web-and-flange member having an undercut recess at an intermediate point in its flange and a perforation in its web adjacent thereto and a web-and-flange member having oppositely projecting lateral tongues at the end of its flanges entering the undercut recess of the member first named, having its web in abutment with the web of the member first named and having a dowel entering the opening in the web of the member first named.

8. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web.

9. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web; said dowels being interlocked.

10. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web; said dowels being interlocked with the continuing web.

11. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web; said dowels being interlocked with the continuing web and with each other.

12. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web; said dowels being interlocked with the continuing web, one of said dowels having a shoulder which engages a wall of the opening in the web of the continuing member and the other of said dowels fitting between the first named dowel and a wall of said opening and holding said first named dowel in its engaging position.

13. In a metal frame structure a continuing member having a web and oppositely extending flanges provided with undercut recesses at opposite points in said flanges and with an opening in the web adjacent thereto and opposed abutting members, each having a web and a flange, provided with undercut heads at the ends of their flanges entering the undercut recesses in the respective flanges of the continuing member and having their webs in abutment with the web of the continuing member and with dowels extending through the opening in the continuing member web; said dowels being interlocked with the continuing web, one of said dowels having a shoulder which engages a wall of the opening in the web of the continuing member and the other of said dowels fitting between the first named dowel and a wall of said opening and holding said first named dowel in its engaging position; said second named dowel extending through the opening in the continuing web and being constructed to interlock with the abutting web beyond the same.

14. In a metal frame structure a continuing member having a web and oppositely extending flanges and provided with an opening through the web and undercut recesses in the flanges; opposed members having webs abutting the continuing member web and constructed with dowels extending through said opening and with undercut projections on their flanges entering the undercut recesses on the continuing member flanges; the web of each abutting member being recessed to receive the projecting dowel on the other abutting member; one of said dowels having a shoulder engaging the bottom wall of the opening and the other of said dowels having a shoulder engaging the recess in the opposed abutting member; the opening in the continuing web being extended in the plane of the dowels, whereby one abutting member may be assembled by transverse movement while the other abutting member may be introduced longitudinally to hold the first named abutting member in engagement.

15. In a metal frame structure a continuing member having a web and oppositely extending flanges and provided with an opening through the web and undercut recesses in the flanges; opposed members having webs abutting the continuing member web and constructed with dowels extending through said opening and with undercut projections on their flanges entering the undercut recesses on the continuing member flanges; the web of each abutting member being recessed to receive the projecting dowel on the other abutting member; one of said dowels having a shoulder engaging the bottom wall of the opening and the other of said dowels having a shoulder engaging the recess in the opposed abutting member; the opening in the continuing web being extended in the plane of the dowels, whereby one abutting member may be assembled by transverse movement while the other abutting member may be introduced longitudinally to hold the first named abutting member to engagement; the dowel and undercut projections on the last named abutting member being flexible, whereby they may be brought into abutment with the parts which they engage after such longitudinal assembly.

The foregoing specification signed at No. 2 Rector street in the city of New York this thirteenth day of November, 1909.

WILLIAM R. KINNEAR.

In presence of—
  GEORGE B. BOYD,
  RAPHAEL DAVIS.